(12) United States Patent
Evans et al.

(10) Patent No.: US 11,934,567 B2
(45) Date of Patent: Mar. 19, 2024

(54) PREVENTING UNAUTHORIZED TRANSLATED ACCESS USING ADDRESS SIGNING

(71) Applicant: NVIDIA Corporation, Santa Clara, CA (US)

(72) Inventors: Jonathon Evans, Santa Clara, CA (US); Kaushal Agarwal, Karnataka (IN)

(73) Assignee: NVIDIA Corporation, Santa Clara, CA (US)

( * ) Notice: Subject to any disclaimer, the term of this patent is extended or adjusted under 35 U.S.C. 154(b) by 211 days.

(21) Appl. No.: 17/467,718

(22) Filed: Sep. 7, 2021

(65) Prior Publication Data

US 2023/0070125 A1 Mar. 9, 2023

(51) Int. Cl.
*G06F 21/79* (2013.01)
*G06F 12/1045* (2016.01)
*G06F 12/14* (2006.01)
*H04L 9/32* (2006.01)

(52) U.S. Cl.
CPC .......... *G06F 21/79* (2013.01); *G06F 12/1054* (2013.01); *G06F 12/1063* (2013.01); *G06F 12/1408* (2013.01); *H04L 9/3247* (2013.01); *G06F 2212/1052* (2013.01); *G06F 2212/657* (2013.01)

(58) Field of Classification Search
CPC .. G06F 21/79; G06F 12/1054; G06F 12/1063; G06F 12/1408; G06F 2212/1052; G06F 2212/657; H04L 9/3247
See application file for complete search history.

(56) References Cited

U.S. PATENT DOCUMENTS

| | | | |
|---|---|---|---|
| 2013/0347064 A1* | 12/2013 | Aissi | G06F 21/53 726/2 |
| 2016/0344731 A1* | 11/2016 | Serebrin | G06F 12/1081 |
| 2018/0011651 A1* | 1/2018 | Sankaran | G06F 12/1009 |
| 2020/0026661 A1* | 1/2020 | Kounavis | G06F 12/0835 |
| 2021/0240629 A1* | 8/2021 | Thomas | H04L 9/0891 |

* cited by examiner

*Primary Examiner* — Matthew T Henning
(74) *Attorney, Agent, or Firm* — Taylor English Duma L.L.P.

(57) ABSTRACT

A host may use address translation to convert virtual addresses to physical addresses for endpoints, which may then submit memory access requests for physical addresses. The host may incorporate the physical address and a signature of the physical address generated using a private key into a translated address field of a response to a translation request. An endpoint may treat the combination as a translated address by storing it in an entry of a translation cache, and accessing the entry for inclusion in a memory access request. The host may generate a signature of the translated address from the request using the private key, with the result being compared to the signature from the request. The memory access request may be verified when the compared values match, and the memory access may be performed using the translated address.

20 Claims, 7 Drawing Sheets

PREVENTING UNAUTHORIZED TRANSLATED ACCESS USING ADDRESS SIGNING

BACKGROUND

PCI Express (PCIe) provides for Address Translation Services (ATS) where a host may use a translation agent to translate a virtual address, provided by an endpoint (e.g., a device interfacing with a root port), to a physical address in memory. The endpoint may cache translations from the translation agent and subsequently use physical addresses derived from the cached translations to request Direct Memory-Access (DMA) transfers. Thus, the translation agent may not be required to perform translation for the DMA transfers, reducing memory access latency and the burden of the translation agent performing address translation. Further, rather than scaling with the host, the cache size used for address translation scales with the endpoint, which is more suited to define an appropriate cache size. However, when requesting a DMA transfer, there is a chance that the physical address included in the request is not one that the endpoint is authorized to access. In various circumstances, such as where the endpoint corresponds to an external device, it may not be possible to trust that the endpoint will not attempt an unauthorized access and so ATS is often disabled. As a further complication, the host may include multiple Virtual Machines (VMs) where an endpoint is part of a Trusted Execution Environment (TEE) of one VM and not the other. In this case, the host should be capable of guaranteeing that the endpoint cannot access the memory of the VM that does not include the endpoint in its TEE, but this may not be possible.

An approach to preventing an endpoint from unauthorized access to physical memory using ATS includes the hosted software maintaining a separate table—per-endpoint—of which memory chunks an endpoint is allowed to access. The host hardware may then cache the tables and/or lookup a table as needed to verify the physical addresses included in DMA requests from endpoints are authorized for those endpoints. This shifts scaling cache size back to the host, which typically isn't in a position to define an appropriate cache size. As such, there may be variability and uncertainty in the latency of DMA requests that use ATS, as a host's cache is typically too small to accommodate a large number of the tables. Additionally, the hosted software may need to be modified to handle invalidation of the cache when terminating an endpoint's access.

SUMMARY

Embodiments of the present disclosure relate to preventing unauthorized translated access using address signing. Systems and methods are disclosed which may verify whether a request from an endpoint for a memory access using a translated address includes a cryptographically modified version of the translated address that was provided to the endpoint. Disclosed approaches may be used to ensure the endpoint is authorized for the memory access.

In contrast to conventional systems, such as those described above, disclosed approaches may provide an endpoint with a cryptographically modified version of a second address translated from the first address. A request from the endpoint for a memory access using the translated address may then be verified by determining the request includes the cryptographically modified version of the translated address.

In at least one embodiment, the first address may be a virtual address and the second address may be a physical address. The cryptographically modified version of the second address may be a hash of the second address generated using a private key and may be provided with the second address in response to a translation request. For example, a combination of the hash and the second address (which in some embodiments is encrypted) may be included in a translated address field of a response to the translation request rather than the translated address alone. The endpoint may treat the combination as a translated address by storing it in an entry of a translation cache, and accessing the entry for inclusion in a memory access request. In order to verify the memory access request, the translated address may be extracted from the request and hashed using the private key, with the result being compared to the hash in the request. The memory access request may be verified when the compared values match, and the memory access may be performed using the translated address.

BRIEF DESCRIPTION OF THE DRAWINGS

The present systems and methods for preventing unauthorized translated access using address signing are described in detail below with reference to the attached drawing figures, wherein.

DETAILED DESCRIPTION

Figure 1:
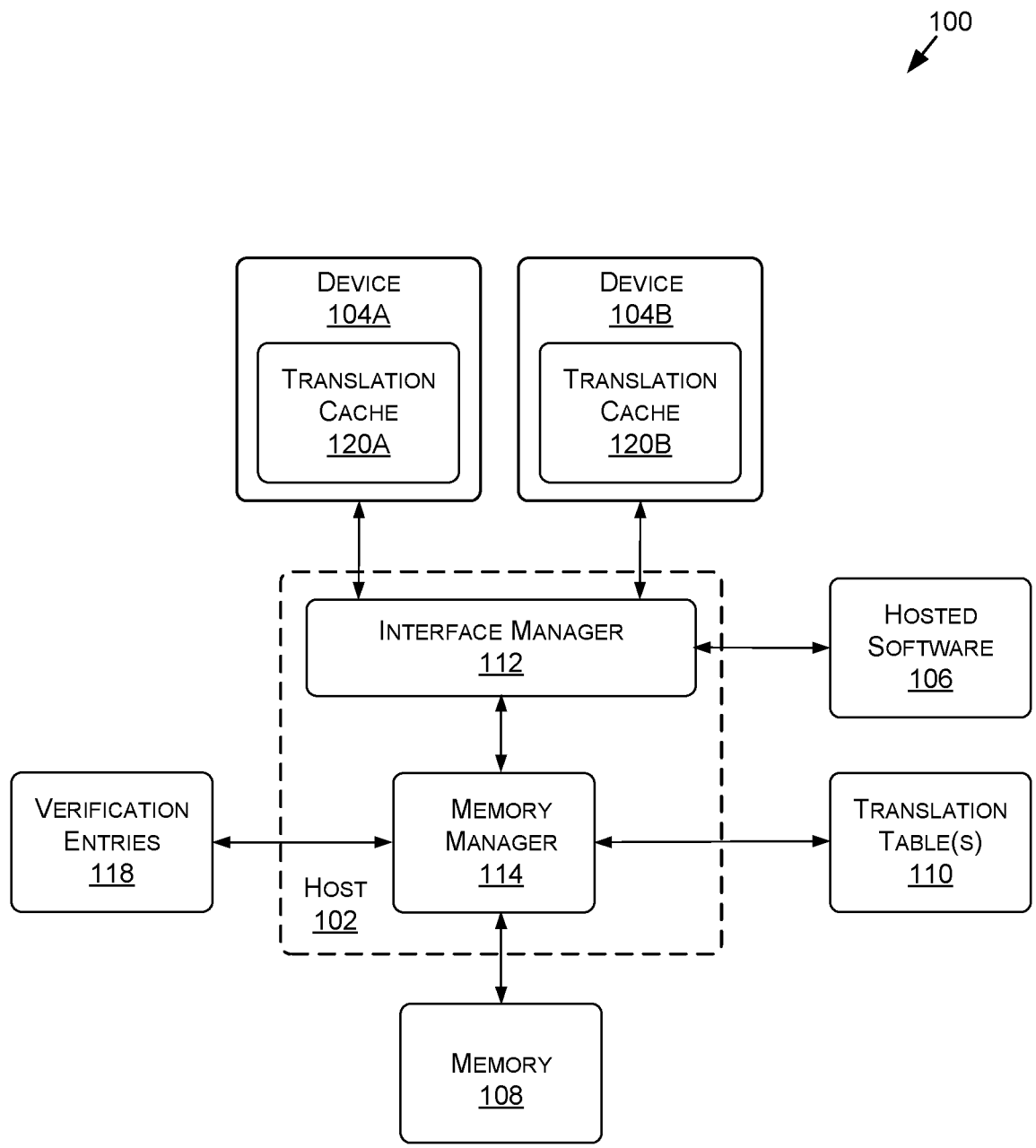
FIG. 1 is an example diagram of an address translation system, in accordance with some embodiments of the present disclosure.

Systems and methods are disclosed related to preventing unauthorized translated access using address signing. Systems and methods are disclosed which may verify whether a request from an endpoint for a memory access using a translated address includes a cryptographically modified version of the translated address that was provided to the endpoint. Disclosed approaches may be used to ensure the endpoint is authorized for the memory access.

In contrast to conventional systems, such as those described above, disclosed approaches may provide an endpoint with a cryptographically modified version of a second address translated from the first address. A request from the endpoint for a memory access using the translated address may then be verified by determining the request includes the cryptographically modified version of the translated address.

In at least one embodiment, the first address may be a virtual address and the second address may be a physical address. The cryptographically modified version of the second address may be a hash (or other form of digital signature) of the second address generated using a private key and may be provided with the second address in response to a translation request. For example, a combination of the hash and the second address (which in some embodiments is encrypted) may be included in a translated address field of a response to the translation request rather than the translated address alone. The endpoint may treat the combination as a translated address by storing it in an entry of a translation cache, and accessing the entry for inclusion in a memory access request. In order to verify the memory access request, the translated address may be extracted from the request and hashed using the private key, with the result being compared to the hash in the request. The memory access request may be verified when the compared values match, and the memory access may be performed using the translated address.

By way of example and not limitation, disclosed approaches may be implemented using Address Translation Services (ATS) of provided by PCI Express (PCIe) where a host may use a translation agent to translate the virtual address, provided by an endpoint (e.g., a device interfacing with a root port), to the physical address in memory. Rather than providing the physical address to the endpoint, the host may provide the cryptographically modified version of the physical address in addition to or alternatively from the physical address. For example, the combination of the hash and the physical address may be provided in the translated address field of the ATS protocol. Thus, the endpoint may be unaware that the received data has been cryptographically modified and treat the data as a translated address. When the endpoint provides a memory access request for the translated address, it may then include the translated address it received in the translated address field of the ATS protocol. Thus, the data can be used to verify whether an address included in the request is one that the endpoint is authorized to access.

In at least one embodiment, the cache size used for address translation may still scale with the endpoint, as a host only needs to store keys (e.g., one per endpoint, process, and/or function) for use in verifying memory access requests. Additionally, the host may include multiple Virtual Machines (VMs) and the endpoint may be part of a Trusted Execution Environment (TEE) of one VM and not the other. Using disclosed approaches, the host may guarantee that the endpoint cannot access the memory of the VM that does not include the endpoint in its TEE.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems implemented at least partially in a data center, systems implemented at least partially using cloud computing resources, and/or other types of systems.

With reference to FIG. 1, FIG. 1 is an example diagram of an address translation system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The address translation system 100 may include, amongst other elements, a host 102, one or more devices, such as a device 104A and/or a device 104B (which may also be referred to collectively as "devices 104" or individually as "device 104"), hosted software 106, one or more memories 108, one or more translation tables 110, and one or more verification entries 118. The host 102 may include an interface manager 112 and a memory manager 114. The devices 104A or 104B may include one or more translation caches, such as a translation cache 120A of the device 104A and a translation cache 120B of the device 104B (which may also be referred to collectively as "translation caches 120" or individually as "a translation cache 120").

As an overview, the host 102 may host the hosted software 106, which may include managing execution of the hosted software 106. The interface manager 112 may be configured to manage communications between the host 102, the hosted software 106, and the devices 104. For example, a device 104 may submit requests to access one or more portions of the memory 108. The memory manager 114 may be configured to manage the memory 108, such as to facilitate access to one or more portions of the memory 108. For example, the memory manager 114 may perform such functions as using the translation table(s) 110 to translate memory addresses, updating the translation table(s) 110, reading data from or writing data to locations corresponding to memory addresses, and/or allocating one or more portions of the memory to one or more entities of the hosted software 106. In one or more embodiments, the memory manager 114 is configured to generate cryptographically modified versions of translated addresses, which may be provided to one or more of the devices 104 for storage in one or more of the translation caches 120. Also, in at least one embodiment, the memory manager 114 may be configured to verify memory access requests based on the cryptographically modified versions of the translated addresses, such as memory access requests provided by the devices 104 using the translation caches 120.

As described herein, the host 102 may host the hosted software 106, which may include managing execution of the hosted software 106. The host 102 may comprise any combination of hardware, software, and/or firmware that facilities hosting of the hosted software 106. By way of example and not limitation, the host 102 may include one or more Virtual Machine Managers (VMM(s)) of virtualization software, such as a hypervisor, and the hosted software 106 may include one or more Virtual Machines (VMs), such as guest operating systems, supported by the hypervisor. Additionally or alternatively, at least one entity of the hosted software 106 may include one or more processes, services, applications, and/or other software entities. While the verification entries 118, the memory 108, the hosted software 106, the translation table 110, and the devices 104 are shown outside of the host 102, any of those components may be included in the host 102 and/or on a System on Chip (SoC) with the host 102. Further, the verification entries 118 and/or the translation tables 110 may be stored at least partially in the memory 108 and/or in different memory. In at least one embodiment, the memory 108 comprises volatile memory, such as Random-Access Memory (RAM), which may include Dynamic RAM (DRAM). In at least one embodiment, a device 104 may comprise a VM or other software entity, such as a VM of the hosted software 106.

The interface manager 112 may be configured to manage communications between the host 102, the hosted software 106, and the devices 104. The interface manager 112 may support any of a variety of host controller interfaces, such as those used for Universal Serial Bus (USB), FireWire, Bluetooth, Ethernet, Peripheral Component Interconnect (PCI), PCI Express (PCIe), Near-Field Communication (NFC), vehicle-to-everything (V2X), Car2Car, Cellular, Wireless Fidelity (WiFi), or other types of communications.

In at least one embodiment, the interface manager 112 may provide address translation over one or more of the host controller interfaces, such that a device 104 or other endpoint can access one or more portions of the memory 108. In providing translation services, the interface manager 112 may use the memory manager 114 to translate an address, provided by a device 104 or other endpoint, to a translated address in the memory 108. In particular, the memory manager may use the translation table(s) 110 and/or other means to determine a translated address from an address. The translated address may be provided to the device 104, which may store the translated address in the translation cache 120. Subsequently, the device 104 may use the translated address from the translation cache 120 to provide memory access requests to the memory 108. For example, the device 104 may request a Direct Memory-Access (DMA) transfer with the memory 108 using the translated address. By using the translated address, the memory manager 114 need not perform address translation for the DMA.

In one or more embodiments, the address provided by a device 104 may be a virtual address and the translated address may be a physical address of the memory 108 determined using the translation table(s) 110 (e.g., a page table and/or Address Translation and Protection Table). However, aspects of the disclosure may be more generally applicable to address translation, which may or may not include virtual to physical address translation. By way of example, in at least one embodiment, the interface manager 112 supports PCIe and includes a Root Complex (RC) to provide Address Translation Services (ATS) and the devices 104 may communicate with the host 102 over root ports managed by the RC. In providing ATS, the interface manager 112 may use a translation agent of the memory manager 114 to translate a virtual address, provided a device 104 to a physical address in the memory 108. For example, the memory manager 114 may include an Input-Output Memory Management Unit (IOMMU) that uses a System Memory Management Unit (SMMU) page table(s) of the translation table(s) 110 for ATS.

When requesting a DMA transfer, there is a chance that the address provided by the device 104 is not an address the device 104 is authorized to access. As a further complication, a device 104 may be part of a Trusted Execution Environment (TEE) of one VM or other entity of the hosted software 106 and not the other. Embodiments of the disclosure allow for the host 102 to guarantee that the device 104 cannot access one or more portions of the memory 108 associated with the VM that does not include the device 104 in its TEE, even where the device 104 provides a physical address that is associated with the VM. To this effect, the memory manager 114 may generate cryptographic information, such as a cryptographically modified version of a translated address, which may be provided to the device 104 for storage in the translation cache 120 of the device 104. For example, in addition to or instead of the translated address, the memory manager 114 may provide the cryptographic information. When a device 104 provides a memory access request, the memory manager 114 may cryptographically verify the request to determine whether the request is authorized. For example, the memory manager 114 may determine whether data provided by the device 104 in association with the request matches or otherwise corresponds to the cryptographic information provided to the device 104. Where the memory manager 114 determines the request does not correspond to the cryptographic information, the request may be denied. In at least one embodiment, a status code, such as an error or fault code may be provided to the device 104 in response to a request that is not authorized.

The memory manager 114 may implement various potential approaches in order to generate the cryptographic information. In at least one embodiment, the memory manager 114 may use a key(s) to cryptographically modify a translated address, such as a session key. A session key may refer to a cryptographic key used to cryptographically modify data in a particular communication session, such as using encryption (asymmetric or symmetric), hashing, cyclic redundancy check generation, salting, stretching, and/or other cryptographic functions. In at least one embodiment, a session may be terminated in association with invalidation of an endpoint's translation cache (e.g., upon determining a pre-determined period of time having elapsed, upon determining an entity of the hosted software 106 has revoked access to and/or modified a translated address, upon determining a translated address no longer belongs to the entity, based on terminating the entity owning the translated address, etc.).

In at least one embodiment, the memory manager 114 uses the key (e.g., a private key) to generate a digital signature from the translated address, such as a hash. For example, the memory manager 114 may hash the translated address or data derived from or otherwise corresponding to the translated address using a hash function. Non-limiting examples include MD5, SHA-1, RIPEMD-160, Whirlpool, SHA-2, SHA-3, BLAKE2, BLAKE3, etc. Additionally or alternatively, the memory manager 114 may use one or more keys to implement a message authentication code (MAC), such as a hash-based MAC (HMAC). Additionally or alternatively, the memory manager 114 may encrypt the translated address, the hash, the MAC, and/or other data derived from or otherwise corresponding thereto. For example, the memory manager 114 may encrypt a combination of the translated address and the hash.

The memory manager 114 may assign one or more keys to one or more particular entities (e.g., a device 104), functions, processes, and/or translated addresses. Further the memory manager 114 may store such assignments in the verification entries 118 for use in cryptographically verifying future communications from an entity and/or for providing cryptographic information to the entity (e.g., in response to a translation request). The memory manager 114 may generate and/or assign keys at any suitable time.

In embodiments where the hosted software 106 includes a VM, the memory manager 114 may allocate a key for a device, function, process, etc., based at least on the entity (e.g., an endpoint) being moved into the TEE of the VM. For example, in response to a request to move the entity into the TEE, the memory manager 114 may generate and/or assign one or more keys to the entity (e.g., one key or key-pair per entity, process, and/or function). As a further example, a key may be generated or assigned in response to an address translation request from the entity. In various embodiments, entities do not receive any assigned keys from the host 102, and the keys may be stored in the verification entries 118 in secure storage inaccessible to the entities (e.g., in the memory 108 and/or other memory). In at least one embodiment, the memory manager 114 may store keys in the verification entries 118 indexed by entity, function, process, session, and/or translated address owner (e.g., a VM allocated a corresponding page) for later retrieval by the memory manager 114. Additionally or alternatively, the memory manager 114 may store cryptographic information generated using the keys in corresponding entries in the verification entries 118 (e.g., using an index).

The memory manager 114 may access the stored keys in the verification entries 118 to generate and/or provide cryptographic information corresponding to a translated address to an entity and/or verify one or more requests from the entity. For example, the memory manager 114 may use information provided by and/or associated with the entity (e.g., in a request from the entity) as lookup criteria to access associated keys used to generate the cryptographic information and/or pre-computed cryptographic information which may be stored in the index of the verification entries 118.

In at least one embodiment, the cryptographic information is provided to a device 104 in response to a translation request. For example, the memory manager 114 may include the cryptographic information in addition to or alternatively from a translated address. In at least one embodiment, the memory manager 114 may receive the translation request from a device 104. Amongst other potential information, the translation request may include data indicating an address to be translated (e.g., a virtual address). Responsive to the request, the memory manager 114 may look up the address in the translation table 110 and receive the corresponding translated address (e.g., a system physical address). The memory manager 114 may also generate and/or retrieve the cryptographic information associated with the translated address and include the cryptographic information in the response. For example, at least a portion of the cryptographic information may be included in at least a portion of a translated address field of the response (e.g., as designated by the communications protocol). By storing the cryptographic information in the translated address field, the cryptographic information can be provided to the device 104 without requiring modification to existing protocols and/or modification to the various entities of the address translation system 100. Further, the device 104 may not be able to distinguish the cryptographic information from a translated address.

In one or more embodiments, the translated address and cryptographic information are included in the response to the translation request. For example, the translated address may be N-bits long and the cryptographic information (e.g., a hash or signature) may be M-bits long. A response may then include a combination of the translated address and the cryptographic information that is M+N-bits long. By way of example and not limitation, the cryptographic information may be attached to the Most Significant Bit (MSB) of the address to form a new value that includes the M-bits of the cryptographic information followed by the N-bits of the translated address. However, the cryptographic information may be stored in other positions or may otherwise be encoded by the bits. In embodiments that include encryption, the memory manager 114 may encrypt the combined cryptographic information and translated address, such as to reduce the probability of an entity attacking the host 102 with synthesized addresses.

By way of example and not limitation, a translated address field used to store the combined value may be anywhere from 40 bits to 80 bits long. In at least one embodiment, the host 102 allocates fewer bits for the translated addresses than the addresses to be translated (e.g., 48 or 40 bits for physical addresses and 64 bits for virtual addresses). At least some of the excess bits may be used to account for the cryptographic information. For example, if there are 40 bits for physical addresses and 64 bits for virtual addresses, as many as 24 bits may be used to store the cryptographic information.

In at least one embodiment, the memory manager 114 may verify translated requests based on cryptographic information associated with one or more translated addresses. For example, the host 102 may receive a translated request from a device 104 (e.g., a memory access request, such as a DMA request). The memory manager 114 may analyze cryptographic information extracted from the translated request to verify the extracted cryptographic information corresponds to cryptographic information associated with a translated address authorized for the requesting endpoint, process, and/or function. In at least one embodiment, the cryptographic information may be extracted from a translated address field of the request (e.g., the signature may be extracted from the MSB or otherwise using knowledge of how and/or where various items should be stored). The memory manager 114 may also retrieve associated keys and/or pre-computed cryptographic information for use in verifying the extracted cryptographic information.

Where the memory manager 114 fails to identify an assigned key or other cryptographic information, the request may result in an error or failure code, which may be provided to the device 104. Where the information is identified, the memory manager 114 may verify that the extracted cryptographic information matches or is otherwise cryptographically compatible with the cryptographic information assigned to the endpoint, process, function, etc. (e.g., an extracted signature matches a signature provided to the endpoint). In embodiments where encryption is employed, the memory manager 114 may first decrypt the cryptographic information using one or more retrieved keys, then verify the decrypted cryptographic information (e.g., using another key to hash a potential translated address). Where a key(s) is retrieved for verification, the signature or other cryptographic information used for verification may be generated on-the-fly using the key(s). Additionally or alternatively, pre-computed cryptographic information used for verification may be retrieved from storage as described herein and compared to values provided by the request.

Where the memory manager 114 determines the cryptographic information does not match or is otherwise not cryptographically compatible with the assigned cryptographic information, the request may result in an error or fault code, which may be provided to the device 104. Otherwise, the memory manager 114 may use a translated address provided by the request, for example, to perform a memory access on corresponding locations in the memory 108. The memory manager 114 may further provide to the device 104, in response to the request, data indicating successful verification and/or execution of the translated request, such as a success code and/or retrieved data.

Disclosed approaches may be implemented completely in hardware, without requiring modification to the hosted software 106. Further, any latency added to processing translation services (e.g., encryption, signature computation, and verification against an incoming signature) may be fixed (e.g., a few clock cycles). Thus, translation services may be provided with consistent and predictable timing, allowing for the system have deterministic performance and workload while avoiding bottlenecks.

Figure 2:
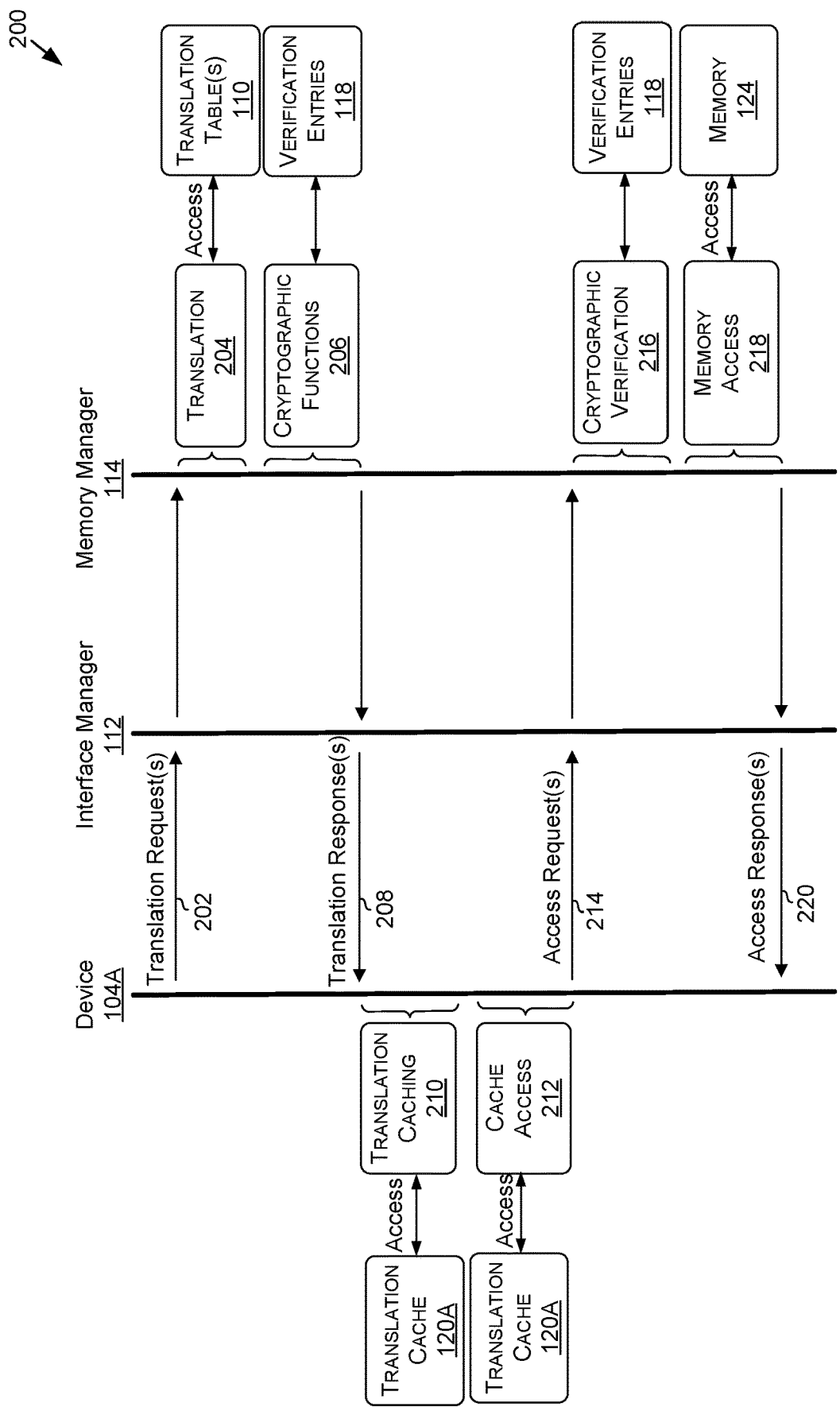
FIG. 2 illustrates an example process of preventing unauthorized translated access using address signing in the address translation system of FIG. 1, in accordance with some embodiments of the present disclosure.

Referring now to FIG. 2, FIG. 2 illustrates an example process 200 of preventing unauthorized translated access using address signing in the address translation system 100 of FIG. 1, in accordance with some embodiments of the present disclosure. The process 200 may include the device 104A providing a translation request 202 to the host 102 (e.g., an ATS request). The interface manager 112 may receive the translation request 202 and provide data corresponding to the translation request 202 to the memory manager 114. The memory manager 114 may perform a translation 204 of an address provided in the translation request 202 using the translation table 110. For example, the memory manager 114 may retrieve a translated address from the translation table 110. The memory manager 114 may further perform cryptographic functions 206 to generate cryptographic information. This may include, for example, hashing the translated address with a key stored in association with the device 104A, a function, and/or a process in the verification entries 118 (and/or generating and storing the key or retrieving pre-generated cryptographic information in other examples). The memory manager 114 may provide the cryptographic information and/or the translated address (e.g., a cryptographically modified version) for a translation response 208, which the interface manager 112 may provide the device 104A.

The device 104A may perform translation caching 210 of information extracted from the translation response 208 (e.g., a value in the translated address field), such as an ATS completion, in the translation cache 120A. Subsequently, the device 104A may perform a cache access 212 of the translation cache 120A to retrieve the cached information for inclusion in an access request 214 (or translated request), such as a DMA request. The device 104A may provide the access request 214 to the host 102. The interface manager 112 may receive the access request 214 and provide data corresponding to the access request 214 to the memory manager 114. The memory manager 114 may perform a cryptographic verification 216 of data provided in the access request 214 (e.g., a value in the translated address field). For example, the memory manager 114 may look up the key in the verification entries 118 using the device 104A, a function, and/or a process identified from or in association with the access request 214. The memory manager 114 may use the key to hash the translated address extracted from the access request 214 (e.g., data in the access request 214 message(s) occupying bits designated for the translated address and/or generated according to a translated address extraction algorithm) and compare the hashed address with a potential hash of the translated address extracted from the access request 214 (e.g., data in the access request 214 message(s) occupying bits designated for the hash and/or generated according to a hash extraction algorithm).

Where the hashed address (or more generally the signature) matches the potential hash, the memory manager 114 may determine the access request 214 is authorized. In response to determining the access request 214 is authorized, the memory manager 114 may use the translated address to perform a memory access 218 of the memory 108 at a location corresponding to the translated address (e.g., to retrieve a corresponding page). In embodiments where the memory access 218 is used to retrieve data, the memory manager 114 may provide data retrieved by the memory access 218 for inclusion in an access response(s) 220 sent to the device 104A. Otherwise, the memory manager 114 may provide a status code or other indicator of a successful memory access to the device 104A. In embodiments where the hashed address does not match the potential hash, the access response may include a status code or other indicator of an unsuccessful memory access, such as a fault or error code.

Figure 3:
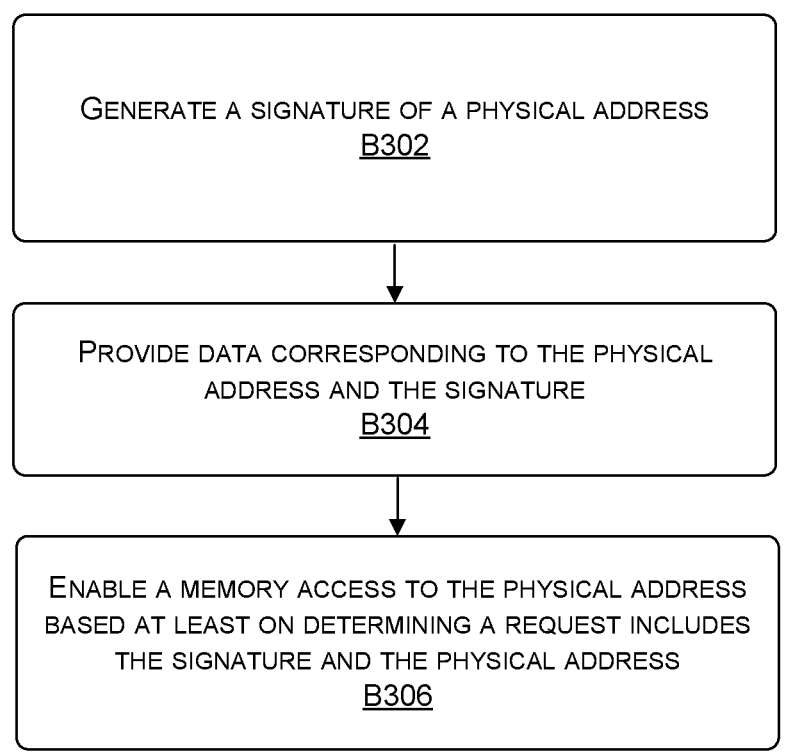
FIG. 3 is a flow diagram showing a method a host may employ for preventing unauthorized translated access using a signature of a physical address, in accordance with some embodiments of the present disclosure.

Now referring to FIG. 3, each block of method 300, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the system of FIG. 1. However, the methods may additionally or alternatively be executed by any one system, or any combination of systems, including, but not limited to, those described herein.

FIG. 3 is a flow diagram showing a method 300 a host may employ for preventing unauthorized translated access using a signature of a physical address, in accordance with some embodiments of the present disclosure. The method 300, at block B302, includes generating a signature of a physical address. For example, the memory manager 114 of the host 102 may generate a signature of a physical address that is translated from a virtual address based at least on a request from a device 104 to translate the virtual address.

The method 300, at block B304, includes providing data corresponding to the physical address and the signature. For example, the interface manager 112 may providing, in response to the request to translate the virtual address, data corresponding to the signature and the physical address to the device 104.

The method 300, at block B306, includes enabling a memory access to the physical address based at least on determining a request includes the signature and the physical address. For example, based at least on the memory manager 114 determining that a request for memory access includes the signature and the physical address, the memory manager 114 may enable the memory access to the physical address.

Figure 4:
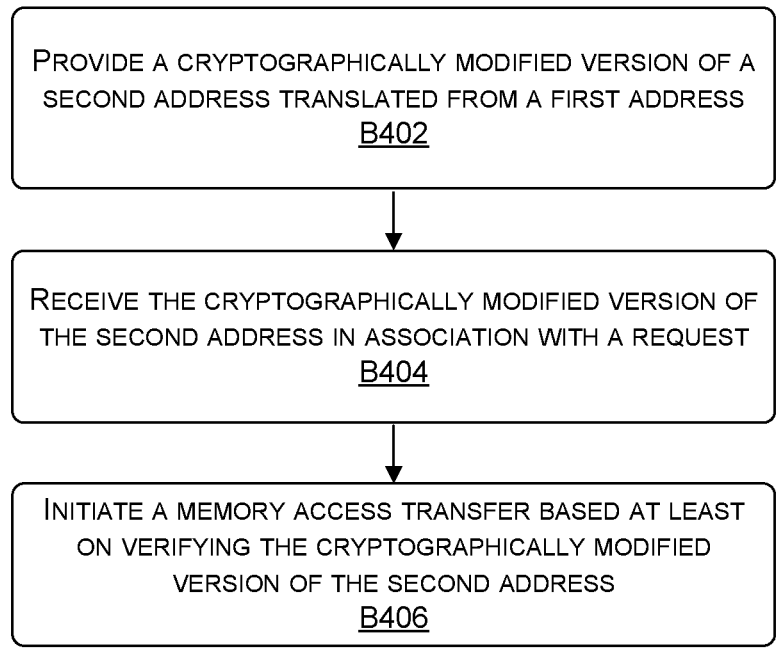
FIG. 4 is a flow diagram showing a method a host may employ for preventing unauthorized translated access using a cryptographically modified version of an address, in accordance with some embodiments of the present disclosure.

Referring to FIG. 4, FIG. 4 is a flow diagram showing a method 400 a host may employ for preventing unauthorized translated access using a cryptographically modified version of an address, in accordance with some embodiments of the present disclosure. The method 400, at B402, includes providing a cryptographically modified version of a second address translated from a first address. For example, the memory manager 114 may provide, based at least on a request from a device 104 to translate a first address, a cryptographically modified version of a second address translated from the first address.

The method 400, at block B404, includes receiving the cryptographically modified version of the second address in association with a request. For example, the memory manager 114 may receive the cryptographically modified version of the second address in association with a request from the device 104 for a memory access transfer with the second address.

The method 400, at block B406, includes initiating a memory access transfer based at least on verifying the cryptographically modified version of the second address. For example, the memory manager 114 may initiate the memory access transfer with the device 104 based at least on verifying the cryptographically modified version of the second address.

Figure 5:
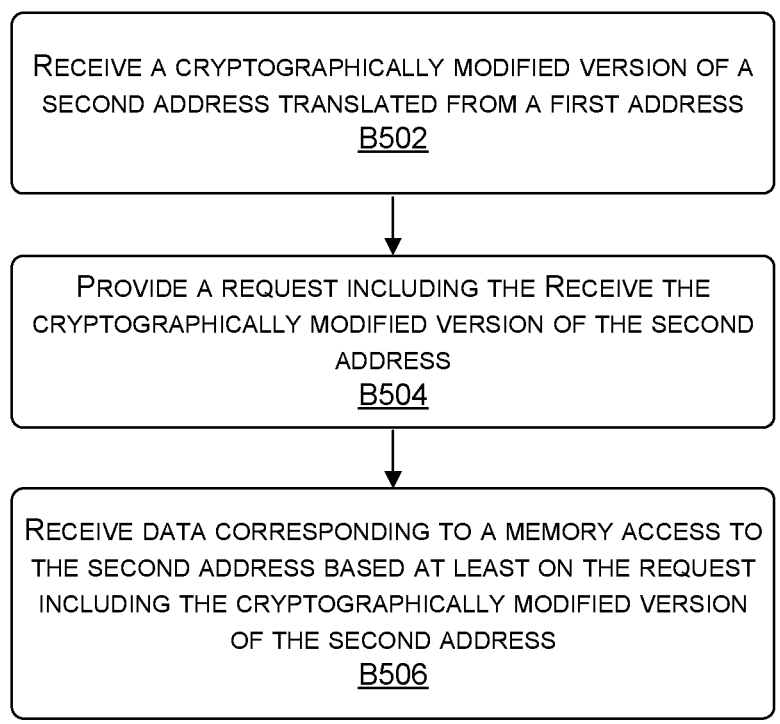
FIG. 5 is a flow diagram showing a method a device may employ for preventing unauthorized translated access using address signing, in accordance with some embodiments of the present disclosure.

Referring to FIG. 5, FIG. 5 is a flow diagram showing a method 500 a device may employ for preventing unauthorized translated access using address signing, in accordance with some embodiments of the present disclosure. The method 500, at block B502, includes receiving, a cryptographically modified version of a second address translated from the first address. For example, a device 104 may receive from the host 102, in response to a request from the device 104 to translate a first address, a cryptographically modified version of a second address translated from the first address.

The method 500, at block B504, includes providing the cryptographically modified version of the second address in association with a request. For example, the device 104 may provide, to the host 102, a request for memory access to the second address, the request including the cryptographically modified version of the second address that was received in the response to the request.

The method 500, at block B506, includes receiving data corresponding to a memory access to the second address based at least on the request including the cryptographically modified version of the second address. For example, the device 104 may receive, from the host 102, data corresponding to the memory access to the second address based at least on the request for the memory access including the cryptographically modified version of the second address.

Example Computing Device

Figure 6:
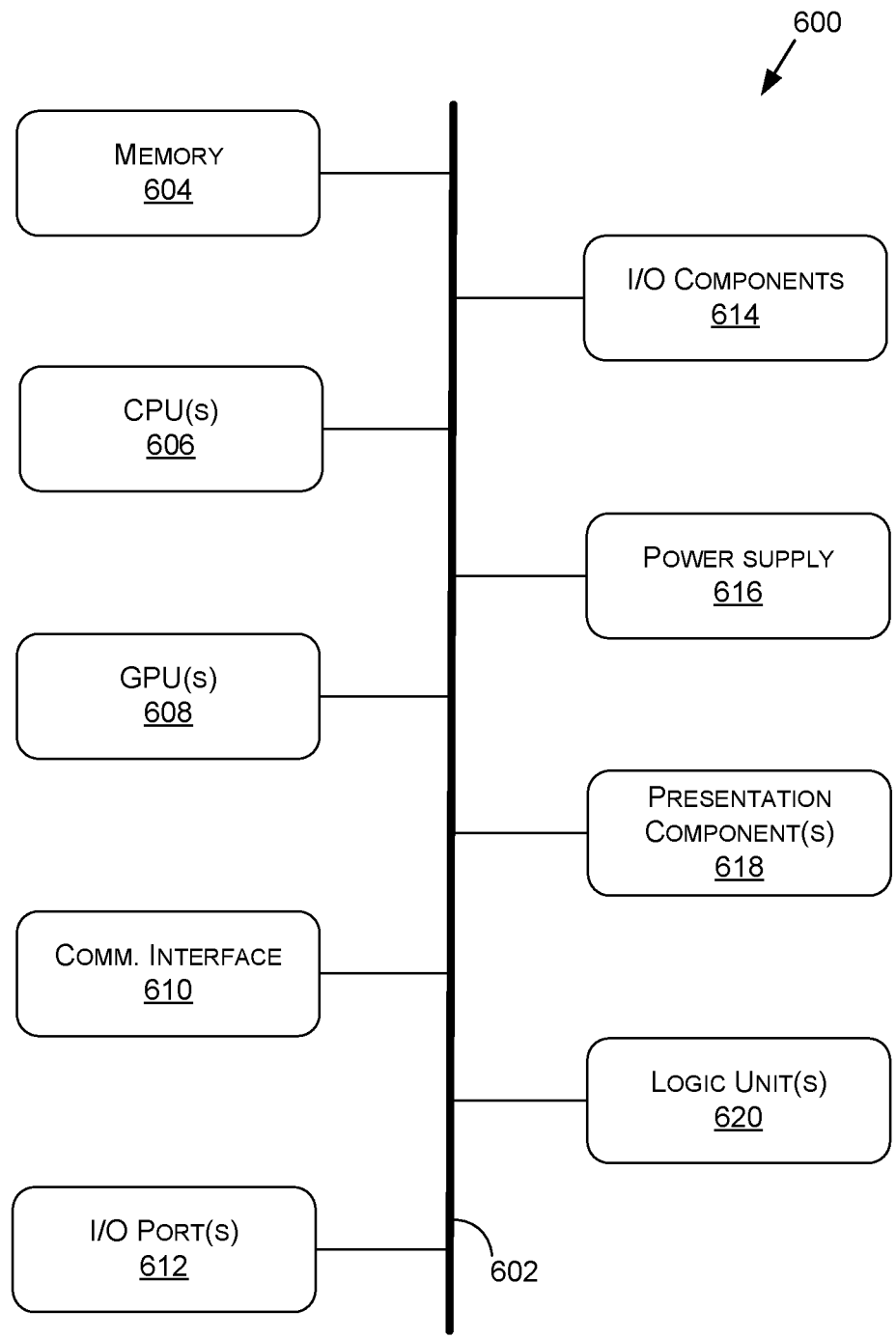
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
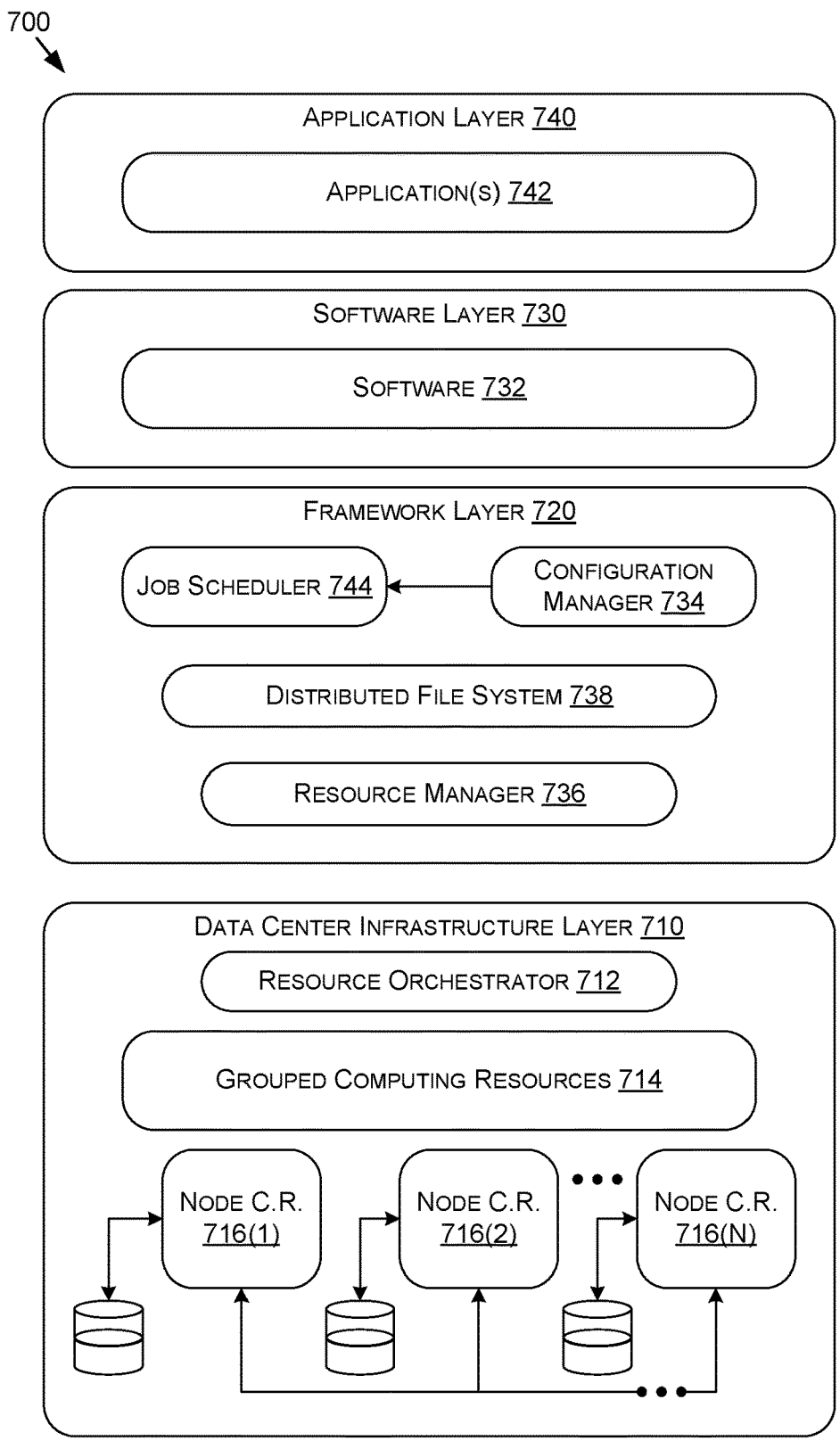
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 744, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may use distributed file system 738 for large-scale data processing (e.g., "big data"). In at least one embodiment, job scheduler 744 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 744. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underused and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
   one or more processing units; and one or more memory units storing instructions that, when executed by the one or more processing units, cause the one or more processing units to execute operations comprising:
   receiving a request to move an entity into a Trusted Execution Environment (TEE) of a Virtual Machine (VM), the TEE associated with a physical address owned by the VM;
   in response to the request to move the entity into the TEE, assigning a key that corresponds to the VM to the entity;
   generating, using the key, a signature of a physical address that is translated from a virtual address based at least on a request to translate the virtual address and based at least on the assigning of the key to the entity;
   providing, in response to the request to translate the virtual address, data corresponding to the signature and the physical address; and
   based at least on determining that a request for memory access includes the signature and the physical address, enabling the memory access to the physical address.

2. The system of claim 1, wherein the providing the data is in a translated address field of the response.

3. The system of claim 1, wherein the determining that a request for memory access includes the signature and the physical address comprises:
   generating a reference signature from a potential physical address included in the request for the memory access using a key that is associated with the request; and
   determining that the reference signature matches the signature that is included in the request for the memory access.

4. The system of claim 1, wherein the data represents at least an encrypted version of a combination of at least the signature and the physical address, and the determining is based at least on decrypting the encrypted version of the combination of at least the signature and the physical address.

5. The system of claim 1, wherein the operations further include invaliding the key based at least on terminating the VM owning the physical address.

6. The system of claim 1, wherein the determining that the request for the memory access includes the signature and the physical address includes:
   generating a reference signature from the physical address using a key that is associated with at least an entity that provided the request for the memory access; and
   determining that the reference signature matches the signature that is included in the request for the memory access.

7. The system of claim 1, wherein the determining that the request for the memory access includes the signature and the physical address includes:
   generating a reference signature from the physical address using a key that is associated with at least a device function indicated by the request for the memory access; and
   determining that the reference signature matches the signature that is included in the request for the memory access.

8. The system of claim 1, wherein the generating, providing, and enabling are performed by a host of the VM.

9. The system of claim 1, wherein the operations further include invaliding the key based at least on the VM revoking access to the physical address.

10. A processor comprising:
one or more circuits to:
   receive a request to move an entity into a Trusted Execution Environment (TEE) of a Virtual Machine (VM), the TEE associated with a first address owned by the VM;
   in response to the request to move the entity into the TEE, assign the entity to the TEE;
   provide, based at least on a request to translate a second address and based at least on the assignment of the entity to the TEE, a cryptographically modified version of the first address translated from the second address,
   receive the cryptographically modified version of the first address in association with a request for a memory access transfer with the first address, and
   initiate the memory access transfer based at least on verifying the cryptographically modified version of the first address.

11. The processor of claim 10, wherein the second address is a virtual address and the first address is a physical address.

12. The processor of claim 10, wherein the cryptographically modified version of the first address comprises a signature generated from the first address.

13. The processor of claim 10, wherein the cryptographically modified version of the first address comprises an encrypted version of at least the first address.

14. The processor of claim 10, wherein the receiving of the cryptographically modified version of the first address is in a translated address field of the request.

15. The processor of claim 10, wherein the verifying the cryptographically modified version of the first address includes:
   generating a signature based at least on decrypting the cryptographically modified version of the first address using a key that is associated with at least an entity that provided the request for the memory access transfer; and
   determining that a reference signature associated with the entity matches the signature.

16. The processor of claim 10, wherein the processor is comprised in at least one of:
   a control system for an autonomous or semi-autonomous machine;
   a perception system for an autonomous or semi-autonomous machine;
   a system for performing simulation operations;
   a system for performing deep learning operations;
   a system implemented using an edge device;
   a system implemented using a robot;
   a system incorporating one or more virtual machines (VMs);
   a system implemented at least partially in a data center; or
   a system implemented at least partially using cloud computing resources.

17. A method comprising:
   receiving, by an entity and in response to a request to translate a first address, a cryptographically modified version of a second address translated from the first address wherein the receiving is based at least on the entity being assigned to a Trusted Execution Environment (TEE) of a Virtual Machine (VM) in response to a request to move the entity into the TEE, the TEE associated with the second address owned by the VM;
   providing a request for memory access to the second address, the request including the cryptographically modified version of the second address that was received in the response to the request; and receiving data corresponding to the memory access to the second address based at least on the request for the memory access.

18. The method of claim 17, further comprising storing the cryptographically modified version of a second address that is received in the response in a translation cache, wherein the request for the memory access is based at least on retrieving the cryptographically modified version of a second address from the translation cache.

19. The method of claim 17, wherein the cryptographically modified version of a second address corresponds to a combination of the second address and a signature of the second address.

20. The method of claim 17, wherein the request to translate the first address, the request for the memory access, and the data corresponding to the memory access are communicated over an interface of a host device.

\* \* \* \* \*